United States Patent [19]
Willars et al.

[11] Patent Number: 5,946,630
[45] Date of Patent: *Aug. 31, 1999

[54] METHOD FOR STORING AND FORWARDING SHORT MESSAGES TO MOBILE SUBSCRIBERS IN A CELLULAR COMMUNICATIONS SYSTEM

[75] Inventors: Per Willars, Stockholm; Jeremy Hamill-Keays, Sollentuna; Mats Stille, Stockholm, all of Sweden

[73] Assignee: Telefonaktiebolaget L M Ericsson (publ), Sweden

[ * ] Notice: This patent issued on a continued prosecution application filed under 37 CFR 1.53(d), and is subject to the twenty year patent term provisions of 35 U.S.C. 154(a)(2).

[21] Appl. No.: 08/677,822

[22] Filed: Jul. 10, 1996

[51] Int. Cl.⁶ .................................................. H04Q 7/20
[52] U.S. Cl. .......................... 455/466; 455/422; 455/433; 370/410
[58] Field of Search ..................... 455/414, 422, 455/432, 433, 435, 445, 466, 560; 370/259, 312, 410, 522

[56] References Cited

U.S. PATENT DOCUMENTS

| | | | |
|---|---|---|---|
| 5,062,108 | 10/1991 | Bales et al. | 370/110.1 |
| 5,159,594 | 10/1992 | Bales et al. | 370/110.1 |
| 5,289,472 | 2/1994 | Cho | 370/110.1 |
| 5,351,235 | 9/1994 | Lahtinen | 455/560 |
| 5,440,613 | 8/1995 | Fuentes | 379/60 |
| 5,526,400 | 6/1996 | Nguyen | 379/59 |
| 5,530,931 | 6/1996 | Cook-Hellberg et al. | 379/211 |
| 5,548,586 | 8/1996 | Kito et al. | 455/466 |
| 5,577,103 | 11/1996 | Foti | 455/414 |
| 5,579,372 | 11/1996 | Astrom | 455/466 |
| 5,628,051 | 5/1997 | Salin | 455/466 |
| 5,682,600 | 10/1997 | Salin | 455/466 |
| 5,687,216 | 11/1997 | Svensson | 455/466 |
| 5,768,509 | 6/1998 | Gunluk | 455/312 |
| 5,787,357 | 7/1998 | Salin | 455/466 |
| 5,794,142 | 8/1998 | Vanttila et al. | 455/466 |

FOREIGN PATENT DOCUMENTS

| | | |
|---|---|---|
| 0 714 214 A2 | 11/1995 | European Pat. Off. . |
| 06006303 | 1/1994 | Japan . |
| 2 290 675 | 6/1994 | United Kingdom . |
| WO 94/07338 | 3/1994 | WIPO . |
| WO 94/16532 | 7/1994 | WIPO . |
| WO 95/12292 | 5/1995 | WIPO . |
| WO 95/12933 | 5/1995 | WIPO . |
| WO 96/03843 | 2/1996 | WIPO . |

*Primary Examiner*—Dwayne D. Bost
*Assistant Examiner*—Nay A. Maung
*Attorney, Agent, or Firm*—Jenkens & Gilchrist, P.C.

[57] ABSTRACT

A method and apparatus for transferring a short message between an originating mobile station and the short message service center permanently associated with the destination mobile station is disclosed. The originating mobile station sends the short message (including the address of the destination mobile station) to the mobile network over an air interface. The mobile network transfers the short message internally between switching nodes. One of the switching nodes interrogates a subscriber database, and passes the mobile station's address to the database, and passes the information showing that this is a short message submitted from a mobile station. The database checks to determine if the destination mobile station is short message service capable. If not, the short message is terminated. Otherwise, the database returns the address of the short message service center permanently associated with the destination mobile station. The short message is transferred through the mobile network to that short message service center.

30 Claims, 1 Drawing Sheet

METHOD FOR STORING AND FORWARDING SHORT MESSAGES TO MOBILE SUBSCRIBERS IN A CELLULAR COMMUNICATIONS SYSTEM

BACKGROUND OF THE INVENTION

1. Field of the Invention

The present invention relates generally to the wireless telecommunications field and, in particular, to the forwarding of short text messages to mobile subscribers in a cellular communications system.

2. History of Related Art

The Global System for Mobile Communications (GSM) is a digital, mobile cellular radiotelephone system that has been introduced as a standard in several European countries. The basic telecommunications services supported by the GSM include two-way voice communications between fixed and mobile subscribers, CCITT Group 3 facsimile transmissions, and synchronous and asynchronous data transmissions at rates of up to 9.6 kbits/s.

A special telecommunications service supported by the GSM is the Short Message Service (SMS). The SMS enables the GSM to route short text messages, each up to 160 alphanumeric characters long, over the signaling channels to or from mobile stations. If a mobile station for which a short message is intended is not in service, or has left the coverage area, the message is stored in a Short Message Service Center (SMS-C). The SMS-C forwards the message to the mobile station when it returns to service or re-enters the coverage area. The SMS can also transfer short messages between a Short Message Service Terminal (SMT) in a data network and GSM mobile stations.

The GSM is divided into a switching subsystem and base station subsystem. A call from a mobile station is received by a base transceiver station, which is part of the base station subsystem. The base transceiver station defines an individual cell in a geographical service area. A base station controller also in the base station subsystem controls a group of base transceiver stations (cells) . A number of base station controllers are served by a mobile services switching center (MSC), which forms a part of the switching subsystem. The MSC controls calls to and from other telephone and data communications systems, such as a Public Switched Telephone Network (PSTN), Integrated Services Digital Network (ISDN), Public Land Mobile Network (PLMN), and various public and private data networks.

If a user in another network (e.g., PSTN) calls a GSM subscriber, the call is connected to a gateway MSC (GMSC). The GMSC finds the location of the GSM subscriber by interrogating a home location register (HLR), which is a database in the switching subsystem. The HLR provides the address of the GSM subscriber in its most current MSC area. The GMSC routes the call to that MSC. The current location of the GSM subscriber is maintained in a visitor location register (VLR), a database containing information about all of the GSM subscribers currently located in that MSC's area. If the GSM subscriber roams into a new MSC area, the VLR associated with the new MSC requests information about the subscriber from the HLR. At the same time, the HLR is informed about the new MSC area in which the subscriber resides.

In the GSM, a short message can be mobile originated or mobile terminated. A mobile originated short message is submitted from a mobile terminal via a base transceiver station to the visited MSC. The visited MSC forwards the message to the SMS-C given by the originating mobile terminal. The SMS-C forwards the message to its destination, which can be a mobile station or a terminal in the data network.

A mobile terminated short message is submitted by a user directly to an SMS-C. The SMS-C forwards the message to a short message service-gateway mobile service center (SMS-GMSC). The SMS-GMSC interrogates the related HLR for transporting information, and reroutes the message to the appropriate MSC. The destination mobile station is paged and a connection is set up between the MSC and the mobile station. Upon set up, the MSC forwards the message in the SMS-C to the mobile station via the signaling channel (e.g., stand alone dedicated control channel or SDCCH). If the message was delivered successfully, a notification report is sent from the MSC to the originating SMS-C. If not, the HLR is so informed and a failure report is sent from the MSC to the originating SMS-C. The notification report or failure report can be sent to the message originator by the SMS-C.

A significant problem arises if numerous SMS-Cs are connected to the mobile network (e.g., to increase the network's SMS capacity). For example, a number of mobile subscribers can each have a personal mailbox. A personal mailbox is a (memory) location in an SMS-C that contains a subscriber's profile for handling incoming short messages, such as, for example, converting an incoming short message to an e-mail format and routing it to an e-mail inbox, or screening incoming messages from certain originating addresses. Notably, the personal mailbox concept can work properly only if all of the short messages intended for a specific subscriber pass through that subscriber's personal mailbox. In other words, all of the subscriber's incoming short messages should pass through one SMS-C containing that subscriber's personal mailbox. However, since mobile stations can roam from one service location to another, different SMS-Cs connected to the network by their respective MSCs can end up storing different short messages intended for a specific subscriber. Consequently, the conventional short message services are not compatible with the concept of a personal mailbox.

Another significant problem arises if numerous SMS-Cs are connected to a mobile network. If the mobile network provides a short message alerting function (e.g., indicating to an SMS-C that a mobile station has contacted the network and a message can be delivered), all of the SMS-Cs that are holding messages for that mobile subscriber will be alerted. Albeit, storing short messages for specific mobile subscribers at different SMS-Cs is a great waste of SMS and network capacity. More importantly, however, the different SMS-Cs' attempts to deliver their respective messages to a specific mobile station results in message collisions, since those different delivery attempts are not coordinated.

SUMMARY OF THE INVENTION

It is an object of the present invention to provide a method and apparatus for forwarding a short message from a message originator directly to a short message service center permanently associated with the destination mobile subscriber.

It is also an object of the present invention to provide a practical personal mailbox capability for short message service subscribers.

It is another object of the present invention to provide a short message service that coordinates message deliveries and thereby minimizes message collisions and wasted capacity.

In accordance with an aspect of the present invention, the foregoing and other objects are achieved by a method and apparatus for forwarding a short message from one mobile subscriber to another, by associating each mobile subscriber with the address of a special SMS-C, and storing the association data in a network database. If a subscriber has a personal mailbox, that mailbox resides in the special SMS-C associated with that subscriber. That special SMS-C handles all short message deliveries to that subscriber's mobile station, and can pass the messages through the personal mailbox, if one exists.

BRIEF DESCRIPTION OF THE DRAWINGS

A more complete understanding of the method and apparatus of the present invention may be had by reference to the following detailed description when taken in conjunction with the accompanying drawing wherein.

DETAILED DESCRIPTION OF THE DRAWINGS

Figure 1:
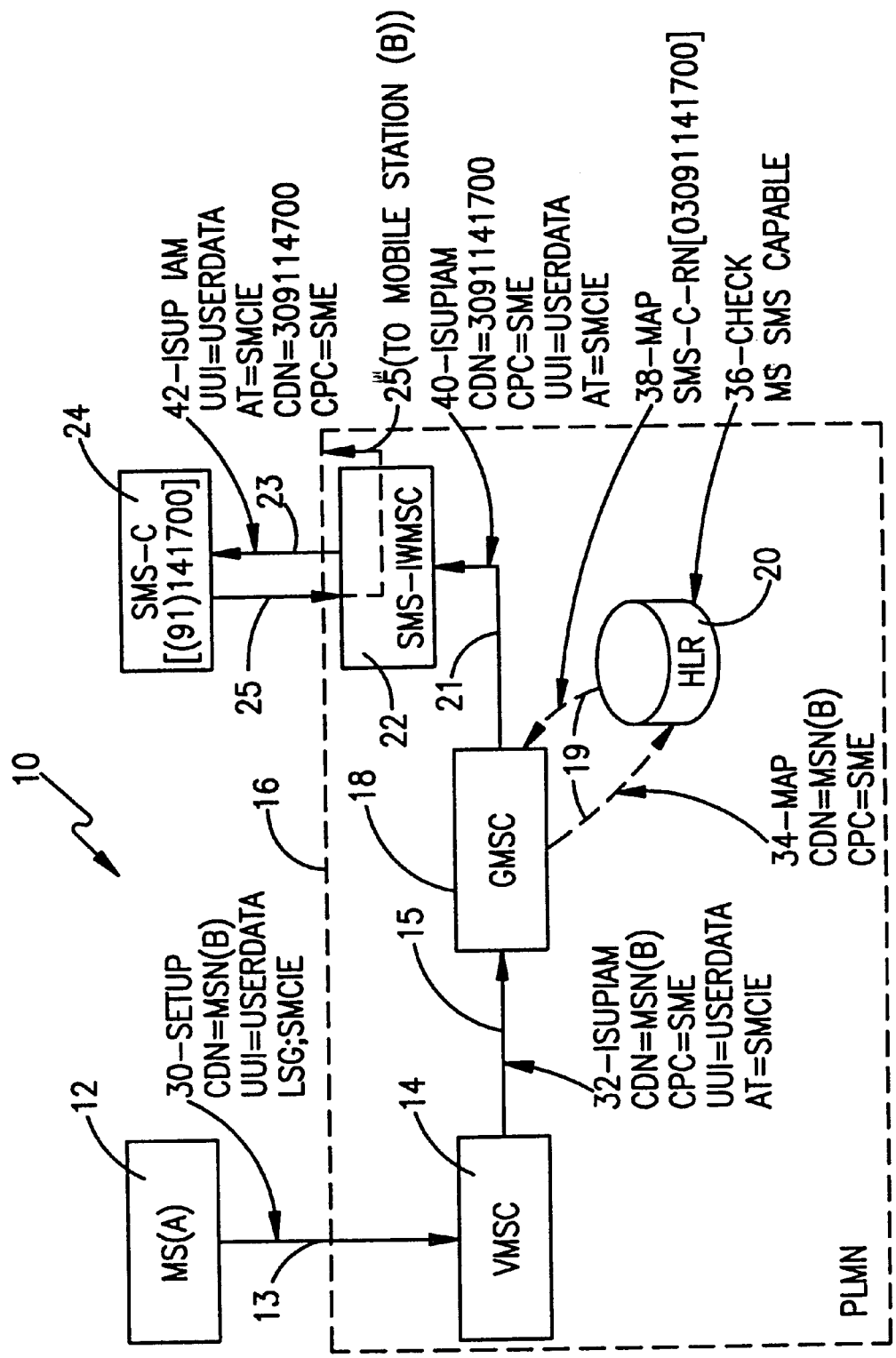
FIG. 1 is a top level block diagram of a cellular mobile telecommunication system, which illustrates a method and apparatus for forwarding short messages to a mobile subscriber, in accordance with a preferred embodiment of the present invention.

The preferred embodiment of the present invention and its advantages are best understood by referring to FIG. 1 of the drawings.

FIG. 1 is a top level block diagram of a cellular mobile telecommunication system, which illustrates a method and apparatus for forwarding short messages to a mobile subscriber, in accordance with a preferred embodiment of the present invention. The embodiment shown in FIG. 1 illustrates how short messages can be forwarded to a specific mobile subscriber in a PDC System type of configuration. However, the embodiment shown is for illustrative purposes only, and the invention is not intended to be so limited. Essentially, the inventive concept can be used more broadly for forwarding short messages to a subscriber in any mobile communications system.

The cellular communications system 10 illustrated by FIG. 1 includes a subscriber mobile station(A) 12 connected by an air interface 13 (e.g., via a transceiver base station not explicitly shown) to a visited MSC (VMSC) 14 in mobile network 16. VMSC 14 provides switching functions for all mobile stations located within a specific control area. VMSC 14 also keeps a copy of subscriber data for all mobile subscribers within that control area. A user may originate (or receive) a short message via MS 12, which can be, for example, one of a plurality of subscribers in a mobile network, such as PLMN 16. In this embodiment, the PLMN (16) illustrated by FIG. 1 is a version of the PDC System operating in Japan. VMSC 14 is connected by a data communications line 15 to a gateway mobile services switching center (GMSC) 18.

GMSC 18 is connected by a signaling network (e.g., number 7 signaling network) 19 to a home location register (HLR) 20. HLR 20 is a database for storing and controlling individual subscriber data for all those subscribers registered with PLMN 16. HLR 20 also contains information about the current location of each of the subscriber mobile stations (i.e., the MSC location area in which each mobile station currently resides). For a mobile originated short message, GMSC 18 has to determine the location of the mobile station being called. GMSC 18 interrogates HLR 20, which (as described in detail below) replies with the address of a specific SMS-C permanently associated with the called mobile station.

In the embodiment illustrated by FIG. 1, GMSC 18 is connected by a data communications line 21 to an SMS-interworking MSC (SMS-IWMSC) 22. The SMS-IWMSC 22 is connected by a data communications line 23 to the destination SMS-C 24. SMS-C 24 can be connected to the destination MS(B) through network 16 when MS(B) makes contact with network 16. As described in detail below, for the preferred embodiment, SMS-C 24 is the dedicated SMS-C that stores and forwards short messages to this destination MS. Consequently, SMS-C 24 can be configured to store and maintain the personal mailbox of MS(B)'s subscriber.

FIG. 1 also illustrates the steps of setting up and sending a mobile originated short message to a specific PLMN subscriber, in accordance with the preferred embodiment of the present invention. Generally, the preferred method associates each mobile subscriber with a special SMS-C address, and stores the association data in a network database (e.g., HLR 20). If a subscriber has a personal mailbox, that mailbox resides in the special SMS-C permanently associated with that subscriber. That special SMS-C handles all short message deliveries to that subscriber's mobile station, and can pass the messages through the personal mailbox, if one exists.

Essentially, the preferred method inserts the mobile station number (MSN) of the destination mobile station for which the short message is intended, into the called party number (CDN) of a Q.931 call control setup message. Thus, the originating subscriber is not required to provide any SMS-C address. When the setup message is submitted, the destination MSN is provided by the GMSC to the HLR, which replies with the address of the special SMS-C permanently associated with that destination MS. At that time, the HLR also checks to ensure that the destination MS is SMS capable (e.g., the destination MS is capable of receiving a short message and/or it has an SMS subscription). If not, the short message process can be immediately terminated, which can achieve substantial savings in network switching capacity and transmission costs by minimizing unnecessary processing of invalid short messages. Otherwise, the valid short message is forwarded from the GMSC to the specific SMS-C permanently associated with the destination MS.

For example, referring again to FIG. 1, when a user at mobile station 12 desires to send a short message to mobile station (B), the user can access a menu and select certain short message control data, such as the called party number or address of mobile station (B), the validity period (e.g., period after which the destination SMS-C will discard the message), and the preferred delivery time. The user can also type in the short message text. Preferably, the user types alphanumeric characters into a memory location in the mobile station with a keypad.

When the user "orders" mobile station 12 to transmit the short message (e.g., by pressing a "send" key), at step 30 in FIG. 1, the mobile station transmits the specified short message text and control data in a Q.931 call control set up message. The short message text is inserted in the Q.931 user-user information (UUI) element, the MSN of the destination mobile station is inserted in the Q.931 CDN information element, and the remainder of the short message control data is inserted in the new SMCIE (as created and defined by the Q.931 call control set up locking shift codeset-6 information element).

Preferably, mobile station 12 performs the short message call setup as a normal call setup procedure. In other words, the MS performs a random access and establishes a layer 2 signaling link over the signaling control channel. The Q.931 call control set up message, which includes the destination mobile's address, and the short message text information and control data, is thereby sent to the network.

In the preferred embodiment, the SMCIE inserted in the Q.931 call control set up message includes a plurality of 8 bit data fields (octets). For example, the SMCIE contains an 8 bit SMCIE identifier field and a separate 8 bit SMCIE length indicator field. The SMCIE also contains an 8 bit identifier field and a separate 8 bit length indicator field for each of the short message control data elements (validity period, etc.) included in the SMCIE. These identifier and length indicator fields enable VMSC 14 to efficiently extract the short message control data from the SMCIE. The SMCIE may also include a short message version data field, which includes an 8 bit identifier field and 8 bit length indicator field. This short message version data field can be used to notify destination SMS-C 24 about the type of short message control data that will be included in the subsequent fields of the SMCIE. This feature advantageously allows destination SMS-C 24 to readily differentiate between SMS versions and types of mobile stations.

The VMSC 14 identifies the call as an SMS call by the inclusion of the new SMCIE in the Q.931 setup message from the mobile station. At step 32, VMSC 14 forwards the SMS call to GMSC 18, including the destination MSN(B), short message text and control data, using a number 7 signaling-based ISDN user part (ISUP) protocol (also used for normal call signaling). The ISUP initial address message (IAM) from VMSC 14 carries the called party number (address of the destination MS) data received from mobile station 12. The IAM calling party category (CPC) field is set to "short message entity" (SME), since VMSC 14 knows that the call is a short message (i.e., a short message element is included in the setup message). VMSC 14 extracts the short message text data received from the mobile station in the Q.931 UUI element, and inserts the text data into the ISUP user-user information (UUI) parameter. The UUI is transferred using the user-user service 1 explicitly requested as essential. The ISUP protocol allows Q.931 information elements to be transported in the ISUP access transport (AT) parameter. The VMSC inserts the locking shift-6 element and SMCIE short message control information into the ISUP AT parameter.

At step 34, GMSC 18 extracts and analyzes the destination MSN(B) received in the ISUP IAM. Since the CDN is set to an MSN, GMSC 18 interrogates HLR 20 using a standard Terminating Call Routing Retrieval Mobile Application Part (MAP) protocol. The MAP message to HLR 20 includes the destination MSN(B) in the CDN field, and the value "SME" in the CPC field. Since the value "SME" is in the CPC field, HLR 20 is thereby informed that this call is an SMS call from a mobile station. At step 36, HLR 20 checks the database to determine whether the destination MS(B) is SMS capable. If not, the GMSC immediately terminates the call.

At step 38, if the destination MS(B) is SMS capable, HLR 20 returns the SMS-C routing number (RN) or address of the specific SMS-C (24) permanently associated with the destination subscriber to GMSC 18 in a standard MAP message. At step 40, GMSC 18 transfers the destination SMS-C's address to SMS-IWSMC 22 in the CDN field of an ISUP IAM. The IAM also contains the value "SME" in the CPC, the short message text in the UUI, and the short message control information in the AT field. SMS-IWSMC 22 routes the short message text information and control data in an ISUP IAM to the destination SMS-C (24). When the short message is deliverable, SMS-C 24 forwards the message to the destination MS(B). Notably, since the short message has been delivered to the special SMS-C permanently associated with this destination mobile subscriber, there can be no message collisions due to uncoordinated message forwarding by different SMS-Cs. Also, since the short message is transferred directly to the destination SMS-C, any waste of transmission and switching capacity due to multiple SMS-C hops is avoided.

Although a preferred embodiment of the method and apparatus of the present invention has been illustrated in the accompanying Drawings and described in the foregoing Detailed Description, it will be understood that the invention is not limited to the embodiment disclosed, but is capable of numerous rearrangements, modifications and substitutions without departing from the spirit of the invention as set forth and defined by the following claims.

For example, it is within the scope of the present invention to modify FIG. 1 by substituting an MSC node for each of VMSC 14, GMSC 18 and SMS-IWMSC 22, and a subscriber database for HLR 20 in the drawing. The subscriber database can be a Service Control Point (SCP) in an intelligent network context. These MSC nodes are switching nodes that can communicate with the originating mobile station, interrogate the subscriber database, and connect with the special destination SMS-C. Alternatively, one MSC can be substituted for the three MSC nodes.

The originating mobile station sends the short message (including the address of the destination mobile station) to the PLMN over an air interface using any appropriate call protocol. The PLMN transfers the short message internally between the switching nodes using any appropriate protocol. One of the switching nodes interrogates the subscriber database, and passes the mobile station's address to the database, as well as information showing that this is a short message submitted from a mobile station. The database checks to determine if the destination mobile station is SMS capable. If not, the short message is terminated. Otherwise, the database returns the address of the SMS-C permanently associated with the destination mobile station. The short message is transferred through the PLMN to that SMS-C. The message transfer may be implemented using any appropriate protocol (e.g., MAP).

The originating mobile station may submit the short message via a VMSC in a visited PLMN other than the destination PLMN 16. In this case, the VMSC can forward the short message call directly to GMSC 18 of destination PLMN 16, using the procedures described above. Alternatively, the VMSC can forward the short message call to a GMSC in the visited PLMN, which then interrogates HLR 20 in destination PLMN 16 before forwarding the short message call to SMS-IWMSC 22 (as described above).

What is claimed is:

1. A method for routing a short message call to a mobile station in a mobile communications network, comprising the steps of:

associating a mobile station number of said mobile station to an address of a dedicated short message service center;

storing said mobile station number of the mobile station and said address of the dedicated short message service center in a database;

submitting a Q.931 call control setup message containing said short message call to said mobile communications network, said step of submitting further includes:

inserting the mobile station number of said mobile station into a called party number element of the Q.931 call control setup message;

inserting short message text into a user-user information element of the Q.931 call control setup message; and inserting control data into a locking shift codeset-6 information element of the Q.931 call control setup message;

upon receipt of the Q.931 call control setup message by said mobile communications network, retrieving said stored address of the dedicated short message service center associated with the stored mobile station number from the database; and forwarding said short message call to said mobile station through the dedicated short message service center.

2. The method of claim 1, wherein said step of retrieving further includes generating, using the Q.931 call control setup message, a first ISUP initial address message and generating, using the first ISUP initial address message, a mobile application part message used to obtain the stored address of the dedicated short message service center.

3. The method of claim 2, wherein said step of generating a first ISUP initial address message further includes:

setting a calling party element of the first ISUP initial address message to short message entity;

inserting the mobile station number of said mobile station into a called party number element of the first ISUP initial address message;

inserting the short message text into an ISUP user-user information element of the first ISUP initial address message; and inserting the control data into an ISUP access transport element of the first ISUP initial address message.

4. The method of claim 3, wherein said step of generating a mobile application part message further includes:

inserting the mobile station number of the mobile station into a called party number element the mobile application message; and inserting the short message entity into a calling party element of the mobile application message.

5. The method of claim 4, wherein said step of forwarding further includes generating a second ISUP initial address message used to route said short message call to said mobile station through the dedicated short message service center, said step of generating further includes:

setting a calling party element of the second ISUP initial address message to the short message entity;

inserting the retrieved address of the dedicated short message service center into a called party number element of the second ISUP initial address message;

inserting the short message text into an ISUP user-user information element of the second ISUP initial address message; and inserting the control data into an ISUP access transport element of the second ISUP initial address message.

6. The method of claim 1, wherein said step of retrieving further includes analyzing the mobile station number of said mobile station and terminating said forwarding of the short message call if said mobile station is not capable to receive said short message call.

7. The method of claim 6, wherein said mobile station is not capable if said mobile station cannot receive short message calls.

8. The method of claim 6, wherein said mobile station is not capable if said mobile station has no subscription short message service.

9. The method of claim 1, wherein said dedicated short message service center further includes a personal mailbox.

10. A method for routing a short message call to a mobile station in a mobile communications network, said method comprising the steps of:

associating a mobile station number of said mobile station to an address of a dedicated short message service center;

storing said mobile station number of the mobile station and said address of the dedicated short message service center in a database;

submitting a Q.931 call control setup message containing the short message call to a visited mobile services switching center;

submitting, responsive to receiving the Q.931 call control setup message, a first ISUP initial address message to a gateway mobile services switching center;

interrogating, responsive to receiving the first ISUP initial address message, the database to obtain the address of the dedicated short message service center using a mobile application part message;

submitting, responsive to obtaining the stored short message service center address, a second ISUP initial address message to a SMS interworking mobile services switching center;

submitting, responsive to receiving the second ISUP initial address message, a third ISUP initial address message to the dedicated short message service center; and forwarding, responsive to receiving the third ISUP initial address message, the short message call to the mobile station.

11. The method of claim 10, wherein said step of submitting a Q.931 call control setup message further includes:

inserting the mobile station number of said mobile station into a called party number element of the Q.931 call control setup message;

inserting short message text into a user-user information element of the Q.931 call control setup message; and inserting control data into a locking shift codeset-6 information element of the Q.931 call control setup message.

12. The method of claim 11, wherein said locking shift codeset-6 information element further includes a SMCIE element including an eight bit identifier field and an eight bit length indicator field for each control data.

13. The method of claim 12, wherein said step of submitting a Q.931 call control setup message further includes enabling the control data to be extracted from the SMCIE element using the eight bit identifier field and the eight bit length indicator field.

14. The method of claim 12, wherein said SMCIE element further includes a short message version data field.

15. The method of claim 11, wherein said step of submitting a Q.931 call control setup message further includes identifying the Q.931 call control setup message as the short message call by the inclusion of the locking shift codeset-6 information element.

16. The method of claim 10, wherein said step of submitting a first ISUP initial address message further includes:

setting a calling party element of the first ISUP initial address message to short message entity;

inserting the mobile station number of said mobile station into a called party number element of the first ISUP initial address message;

inserting the short message text into an ISUP user-user information element of the first ISUP initial address message; and inserting the control data into an ISUP access transport element of the first ISUP initial address message.

17. The method of claim 10, wherein said step of interrogating further includes:

inserting the mobile station number of the mobile station into a called party number element the mobile application part message; and inserting short message entity into a calling party element of the mobile application part message.

18. The method of claim 17, wherein said step of interrogating further includes informing the database that the first ISUP initial address message is the short message call by including the short message entity in the calling party element of the mobile application part message.

19. The method of claim 10, wherein said step of submitting a third ISUP initial address message further includes:

setting a calling party element of the third ISUP initial address message to short message entity;

inserting the obtained address of the dedicated short message service center into a called party number element of the third ISUP initial address message;

inserting the short message text into an ISUP user-user information element of the third ISUP initial address message; and inserting the control data into an ISUP access transport element of the third ISUP initial address message.

20. The method of claim 10, wherein said step of submitting a fourth ISUP initial address message further includes:

setting a calling party element of the fourth ISUP initial address message to short message entity;

inserting the obtained address of the dedicated short message service center into a called party number element of the fourth ISUP initial address message;

inserting the short message text into an ISUP user-user information element of the fourth ISUP initial address message; and inserting the control data into an ISUP access transport element of the fourth ISUP initial address message.

21. A mobile communications network for routing a short message call to a mobile station, said mobile communications network comprising:

a dedicated short message service center;

a database for storing a mobile station number and an associated address of the dedicated short message service center;

means for receiving a Q.931 call control setup message containing said short message call, said Q.931 call control setup message further includes:

a called party number element for storing the mobile station number;

a user-user information element for storing short message text; and a locking shift codeset-6 information element for storing control data;

means, responsive to receiving the Q.931 call control setup message, for retrieving said address of the dedicated short message service center from the database; and means, responsive to retrieving the address, for forwarding said short message call to said mobile station through the dedicated short message service center.

22. The mobile communications network of claim 21, wherein said means for retrieving further includes means for generating, using the Q.931 call control setup message, a first ISUP initial address message and means for generating, using the first ISUP initial address message, a mobile application part message used to obtain the address of the dedicated short message service center.

23. The mobile communications network of claim 22, wherein said first ISUP initial address message further includes:

a calling party element set to short message entity;

a called party number element for storing the mobile station number of said mobile station;

an ISUP user-user information element for storing the short message text; and an ISUP access transport element for storing the control data.

24. The mobile communications network of claim 23, wherein said mobile application part message further includes:

a called party number element for storing the mobile station number of the mobile station; and a calling party element for storing the short message entity.

25. The mobile communications network of claim 24, wherein said second ISUP initial address message used to route said short message call to said mobile station through the dedicated short message service center further includes:

a calling party element set to short message entity;

a called party number element for storing the obtained address of the dedicated short message service center;

an ISUP user-user information element for storing the short message text; and an ISUP access transport element for storing the control data.

26. The mobile communications network of claim 21, wherein said means for retrieving further includes means for analyzing the mobile station number of said mobile station and means terminating the short message call if said mobile station is not capable to receive said short message call.

27. The mobile communications network of claim 26, wherein said mobile station is not capable if said mobile station cannot receive short message calls.

28. The mobile communications network of claim 26, wherein said mobile station is not capable if said mobile station has no subscription short message service.

29. The mobile communications network of claim 21, wherein said dedicated short message service center further includes a personal mailbox.

30. A method for routing a short message call to a mobile station in a mobile communications network, comprising the steps of:

associating a mobile station number of said mobile station to an address of a dedicated short message service center;

storing said mobile station number of the mobile station and said address of the dedicated short message service center in a database;

submitting a Q.931 call control setup message containing said short message call to said mobile communications network, upon receipt of the Q.931 call control setup message by said mobile communications network, retrieving said stored address of the dedicated short message service center associated with the stored mobile station number from the database, said step of retrieving further includes:

generating, using the Q.931 call control setup message, a first ISUP initial address message; and generating, using the first ISUP initial address message, a mobile application part message used to obtain the stored address of the dedicated short message service center; and forwarding said short message call to said mobile station through the dedicated short message service center, said step of forwarding further includes:

generating a second ISUP initial address message used to route said short message call to said mobile station through the dedicated short message service center, said step of generating further includes:

setting a calling party element of the second ISUP initial address message to the short message entity;

inserting the retrieved address of the dedicated short message service center into a called party number element of the second ISUP initial address message;

inserting the short message text into an ISUP user-user information element of the second ISUP initial address message; and inserting the control data into an ISUP access transport element of the second ISUP initial address message.

\* \* \* \* \*

UNITED STATES PATENT AND TRADEMARK OFFICE
CERTIFICATE OF CORRECTION

PATENT NO. : 5,946,630
DATED : Aug. 31, 1999
INVENTOR(S) : Willars et al.

It is certified that error appears in the above-identified patent and that said Letters Patent is hereby corrected as shown below:

Item [57], line 10    Replace "and passes the"
                      With --as well as--

Column 2, line 13     Replace "in"
                      With --to--

Signed and Sealed this

Twenty-first Day of March, 2000

Attest:

Attesting Officer

Q. TODD DICKINSON
Commissioner of Patents and Trademarks